United States Patent
Konno (10) Patent No.: US 10,153,498 B2
(45) Date of Patent: Dec. 11, 2018

(54) FUEL CELL SEPARATOR AND FUEL CELL

(71) Applicant: TOYOTA JIDOSHA KABUSHIKI KAISHA, Toyota-shi, Aichi-ken (JP)

(72) Inventor: Norishige Konno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 223 days.

(21) Appl. No.: 15/022,050

(22) PCT Filed: Sep. 30, 2014

(86) PCT No.: PCT/JP2014/004991
§ 371 (c)(1),
(2) Date: Mar. 15, 2016

(87) PCT Pub. No.: WO2015/049859
PCT Pub. Date: Apr. 9, 2015

(65) Prior Publication Data
US 2016/0233522 A1    Aug. 11, 2016

(30) Foreign Application Priority Data
Oct. 1, 2013 (JP) .................................. 2013-206474

(51) Int. Cl.
| | |
|---|---|
| *H01M 8/026* | (2016.01) |
| *H01M 8/1004* | (2016.01) |
| *H01M 8/241* | (2016.01) |
| *H01M 8/2457* | (2016.01) |
| *H01M 8/248* | (2016.01) |
| *H01M 8/1018* | (2016.01) |

(52) U.S. Cl.
CPC ......... *H01M 8/026* (2013.01); *H01M 8/1004* (2013.01); *H01M 8/241* (2013.01); *H01M 8/248* (2013.01); *H01M 8/2457* (2016.02); *H01M 2008/1095* (2013.01); *H01M 2250/20* (2013.01); *Y02T 90/32* (2013.01)

(58) Field of Classification Search
CPC .... H01M 8/248; H01M 8/026; H01M 8/2457; H01M 8/1004; H01M 8/241; H01M 2008/1095; H01M 2250/20; Y02T 90/32
See application file for complete search history.

(56) References Cited

U.S. PATENT DOCUMENTS

| | | | |
|---|---|---|---|
| 2010/0285384 A1 | 11/2010 | Nakagawa et al. | |
| 2012/0301806 A1 | 11/2012 | Okabe | |
| 2013/0177827 A1* | 7/2013 | Okabe | H01M 8/0258 429/434 |

FOREIGN PATENT DOCUMENTS

| | | |
|---|---|---|
| EP | 2618413 A1 | 7/2013 |
| JP | 2006-173090 | 6/2006 |
| JP | 2007-194077 A | 8/2007 |
| JP | 2013-54872 | 3/2013 |
| WO | WO 2010/064366 A1 | 6/2010 |
| WO | WO 2012/035585 A1 | 3/2012 |
| WO | WO 2012/160607 A1 | 11/2012 |

* cited by examiner

*Primary Examiner* — Muhammad S Siddiquee
(74) *Attorney, Agent, or Firm* — Dickinson Wright, PLLC (57) ABSTRACT

An anode-side separator 120 includes first grooves 202 and second grooves 204 that are located alternately in a separator central region 121 opposed to a power generation region 112 of a MEGA 110 by formation of a plurality of pit-and-bump stripes provided by press molding. The first grooves 202 extend in the separator central region 121 on the gas surface side of the anode-side separator 120, while the second grooves 204 extend in the separator central region 121 on the cooling surface side opposite to the as surface side. Terminal first grooves 202t that are first grooves 202 extending on the outer edge portion 123 side outside the separator central region have lower terminal-side rising height Ht than the other first grooves 202 positioned on the separator central region 121 side.

4 Claims, 8 Drawing Sheets

FUEL CELL SEPARATOR AND FUEL CELL

CROSS-REFERENCE TO RELATED APPLICATIONS

This application is a national phase application of International Application No. PCT/JP2014/004991, filed Sep. 30, 2014, and claims the priority of Japanese Application No. 2013-206474, filed Oct. 1, 2013, the content of both of which is incorporated herein by reference.

TECHNICAL FIELD

The present invention relates to a fuel cell separator and a fuel cell.

BACKGROUND ART

A fuel cell is provided in a stack structure in which fuel cell-constituting unit cells each serving as a power generation unit are stacked in a plurality of layers. Each of the unit cells has a membrane electrode assembly sandwiched by opposing separators. In recent years, there has been proposed, e.g. in Japanese Laid-open Patent Publication 2013-54872, a technique of forming recessed grooves as a fuel-gas gas flow path and recessed grooves as a cooling water flow path on front-and-back surfaces of the separator by a plurality of pit-and-bump stripes made by press molding.

According to the separator proposed in the above-cited patent reference, it is possible to achieve simplification of the structure, size reduction in the stacking direction of the fuel-cell unit cells, and moreover stacking of large numbers of unit cells. A fuel cell is mounted on, for example, a vehicle or the like while the stacked unit cells are tightened with force applied in their stacking direction, the tightening force is always applied to the unit cells of the fuel cell. Since the way how the tightening force is applied to various sites on each unit cell such as its power generation region and vicinities thereof is not necessarily uniform, the following failures as described below can be occurred due to the tightening force being always applied. Since an outer edge portion of a fuel cell separator extends outward from a separator central region opposed to the power generation region of a membrane electrode assembly, a peripheral edge of the membrane electrode assembly and a seal member for sealing the peripheral edge are overlapped at the outer edge portion of the fuel cell separator. Such interposition of the seal member tends to increase the thickness of the peripheral edge of the membrane electrode assembly, which is an object to be sandwiched with another separator, in the outer edge portion of the fuel cell separator. In contrast, in the central region of the separator, since its opposing region is the power generation region of the membrane electrode assembly and thus no other members like the seal member exists, the thickness of the membrane electrode assembly, which is an object to be sandwiched with another separator, is generally uniform. If the issues for recessed grooves as the flow path positioned and extending on the outer edge portion side and recessed grooves as the flow path positioned and extending in the separator central region are not addressed, surface pressure becomes higher around the recessed grooves extending on the outer edge portion side on account of the above-described thickness conditions, so buckling of the membrane electrode assembly or damage to the electrolyte membrane might be incurred. In the above-cited patent reference, unfortunately, coping for such failures could not be said enough, leading to an indication that there is room for improvement based on the formation of recessed grooves on the front-and-back surfaces of the separator. In addition to this, there are also needs for simple-and-easy measures for failures that can occur due to effects of the tightening force to the individual unit cells of the fuel cell as well as for enabling a reduction of the fuel cell manufacturing cost and the like.

In order to achieve at least part of the above-described problems, the present invention may be implemented in the following aspects.

SUMMARY

In a first aspect of the invention, a fuel cell separator that is to be assembled to a membrane electrode assembly and has a first surface and a second surface as a back surface of the first surface is provided. The fuel cell separator according to the first aspect includes a central region opposed to a power generation-enabled region of the membrane electrode assembly, a planar-shaped outer edge portion extending from the central region to outer edge of the central region, a first surface-side recessed groove part formed in the central region on the first surface; and a second surface-side recessed groove part formed in the central region on the second surface. Grooves of the first surface-side recessed groove part and grooves of the second surface-side recessed groove part are formed alternatively on the first surface and the second surface in the central region by formation of a plurality of pit-and-bump stripes with press molding on the central region, and a bottom wall of the first surface-side recessed groove part in the first surface-side recessed groove part at a boundary position where an end portion of a member other than the membrane electrode assembly may be located has lower rising height from a recessed-groove opening end than the other bottom walls of the first surface-side recessed groove part.

The fuel cell separator according to the first aspect has structure that the rising height of a bottom wall from the recessed-groove opening end of the first surface-side recessed groove part at the boundary position where an end portion of a member other than the membrane electrode assembly may be located is lower than that of the other bottom walls of the first surface-side recessed groove part positioned in the separator central region. Therefore, in the case surface pressure is applied to the separator central region and the planar-shaped outer edge portion extending on outer edge of the separator central region, according to the fuel cell separator of the first aspect, the surface pressure applied to around the first surface-side recessed groove part at the boundary position can be relaxed in comparison to that around the other first surface-side recessed groove part positioned on the separator central region side by a degree proportional to a lowness of the rising height of the bottom wall from the recessed-groove opening end. As a result, according to the fuel cell separator of the first aspect, even if surface pressure is applied to the separator central region and the planar-shaped outer edge portion extending on outer edge of the separator central region with the membrane electrode assembly sandwiched in cooperation with another separator, buckling of the membrane electrode assembly and damage to the electrolyte membrane can be avoided or suppressed by relaxation of the surface pressure around the first surface-side recessed groove part at the boundary position.

In the fuel cell separator according to the first aspect, the boundary position may be located on an outer edge portion side of the first surface-side recessed groove part, and a rising height of the bottom wall of the first surface-side recessed groove part on the outer edge portion side of the first surface-side recessed groove part may be lower than that of the other bottom walls of the first surface-side recessed groove part. Moreover, a rising height of a bottom wall of the first surface-side recessed groove part positioned on an outermost edge portion side in the bottom walls of the first surface-side recessed groove part on the outer edge portion side of the first surface-side recessed groove part may be lower than that of the other bottom walls of the first surface-side recessed groove part positioned in the central region.

In these fuel cell separators according to the first aspect, the rising height of one or plural bottom walls on the outer edge portion or the bottom wall of the first surface-side recessed groove part positioned on the outermost edge portion side may be set lower, and the lowering of the rising height can be achieved simply by adjusting the protruding height of the press metal mold. Therefore, according to the fuel cell separators of the first aspect, the manufacturing cost can be reduced and moreover failures that can occur due to the effect of the tightening force can be solved or suppressed with a simple countermeasure of metal mold adjustment.

In a second aspect of the invention, a fuel cell separator that is to be assembled to a membrane electrode assembly and has a first surface and a second surface serving as a back surface of the first surface is provided. The fuel cell separator according to the second aspect includes: a central region opposed to a power generation-enabled region of the membrane electrode assembly; a planar-shaped outer edge portion extending from the separator central region opposed to the power generation region of the membrane electrode assembly to outer edge of the separator central region; a first surface-side recessed groove part formed on one surface side in the separator central region on the first surface; and a second surface-side recessed groove part formed on the other surface side in the separator central region on the second surface, wherein grooves of the first surface-side recessed groove part and grooves of the second surface-side recessed groove part are formed alternately between front and back surfaces of the separator on the first surface and the second surface in the separator central region by formation of a plurality of pit-and-bump stripes with press molding on the separator central region, and wherein bottom wall of the first surface-side recessed groove part positioned on an outermost edge portion side in the first surface-side recessed groove part, has lower rising height from a recessed-groove opening end than the other bottom walls of the first surface-side recessed groove part positioned in the separator central region.

The fuel cell separator of the mode according to the second aspect has a structure that the rising height of the bottom wall from the recessed-groove opening end of the first surface-side recessed groove part positioned on the outermost edge portion side is lower than that of the other bottom walls of the first surface-side recessed groove part positioned in the separator central region. Therefore, in the case where surface pressure is applied to the separator central region and the planar-shaped outer edge portion extending on its outer edge, according to the fuel cell separator of the first aspect, the surface pressure applied to around the first surface-side recessed groove part positioned and extending on the outer edge portion side can be relaxed in comparison to that around the other first surface-side recessed groove part positioned on the separator central region side by a degree proportional to a lowness of the rising height of the bottom wall from the recessed-groove opening end. As a result of this, according to the fuel cell separator of the first aspect, even if surface pressure is applied to the separator central region and the planar-shaped outer edge portion extending on its outer edge with the membrane electrode assembly sandwiched in cooperation with another separator, buckling of the membrane electrode assembly and damage to the electrolyte membrane can be avoided or suppressed by relaxation of the surface pressure around the first surface-side recessed groove part on the outermost edge portion side. Further, in the fuel cell separator of the mode according to the second aspect, the rising height of the bottom wall of the first surface-side recessed groove part extending on the outermost edge portion side may be set lower, and the lowering of the rising height can be achieved simply by adjusting the protruding height of the press metal mold. Therefore, according to the fuel cell separator in the above-described mode of the second aspect, the manufacturing cost can be reduced and moreover failures that can occur due to the effect of the tightening force can be solved or suppressed with a simple countermeasure of metal mold adjustment.

In a third aspect of the invention, a fuel cell is provided. In the fuel cell according to the third aspect, a plurality of fuel-cell unit cells each having a membrane electrode assembly sandwiched between a first separator and a second separator are stacked, each of the fuel-cell unit cells including: the fuel cell separator according to the first or second aspect as the first separator, wherein the outer edge portion is joined to a site outside the power generation region of the membrane electrode assembly. In fuel-cell unit cells stacked adjoiningly, the bottom wall of the first surface-side recessed groove part included in the first separator of one of the fuel-cell unit cells is in contact with the second separator of the other fuel-cell unit cell.

In the fuel cell of the third aspect, the first separator for sandwiching the membrane electrode assembly is provided as a separator in which the first surface-side recessed groove part extends on the planar-shaped outer edge portion side extending from the separator central region to the outer edge, and which allows the relaxation of surface pressure around the first surface-side recessed groove part. Then, with the membrane electrode assembly sandwiched by the first and second separators, the separator central region of the first separator is opposed to the power generation region of the membrane electrode assembly, and the outer edge portion of the first separator is joined to a site outside the power generation region of the membrane electrode assembly. Therefore, in the fuel cell according to the third aspect, the surface pressure applied over a range from the separator central region to its outward outer edge portion is relaxed around the first surface-side recessed groove part extending on the outer edge portion side with the sealing part interposed. As a result of this, according to the fuel cell of the third aspect, buckling of the membrane electrode assembly and damage to the electrolyte membrane can be avoided or suppressed, so that the service life of the fuel cell can be prolonged and moreover its cell performance can be sustained. Further, according to the fuel cell of the third aspect, the first separator, in which the rising height of the bottom walls of the first surface-side recessed groove part extending on the outer edge portion side is set lower, may be replaced with another one in the existing fuel-cell unit cell. Therefore, a reduction of the fuel cell manufacturing cost can be fulfilled and, what is more, failures that can occur due to the effect of the tightening force can be solved or suppressed with simplicity. In addition, in the fuel cell according to the third aspect, the first surface-side recessed groove part in the separator central region of the first separator can be made to serve also as a flow path for the gas supplied to the membrane electrode assembly. Further, by putting the bottom wall of the first surface-side recessed groove part included in the first separator of one unit cell stacked adjoiningly each other, into contact with the second separator of the other unit cell, the second surface-side recessed groove part can be closed so that the closed second surface-side recessed groove part can be made to serve as a cooling water flow path that allows the cooling water to pass therethrough.

The present invention may be implemented in various modes. For example, the invention can be implemented in such modes as a manufacturing method for fuel cells or a unit cell for fuel cells.

DESCRIPTION OF EMBODIMENTS

Figure 1:
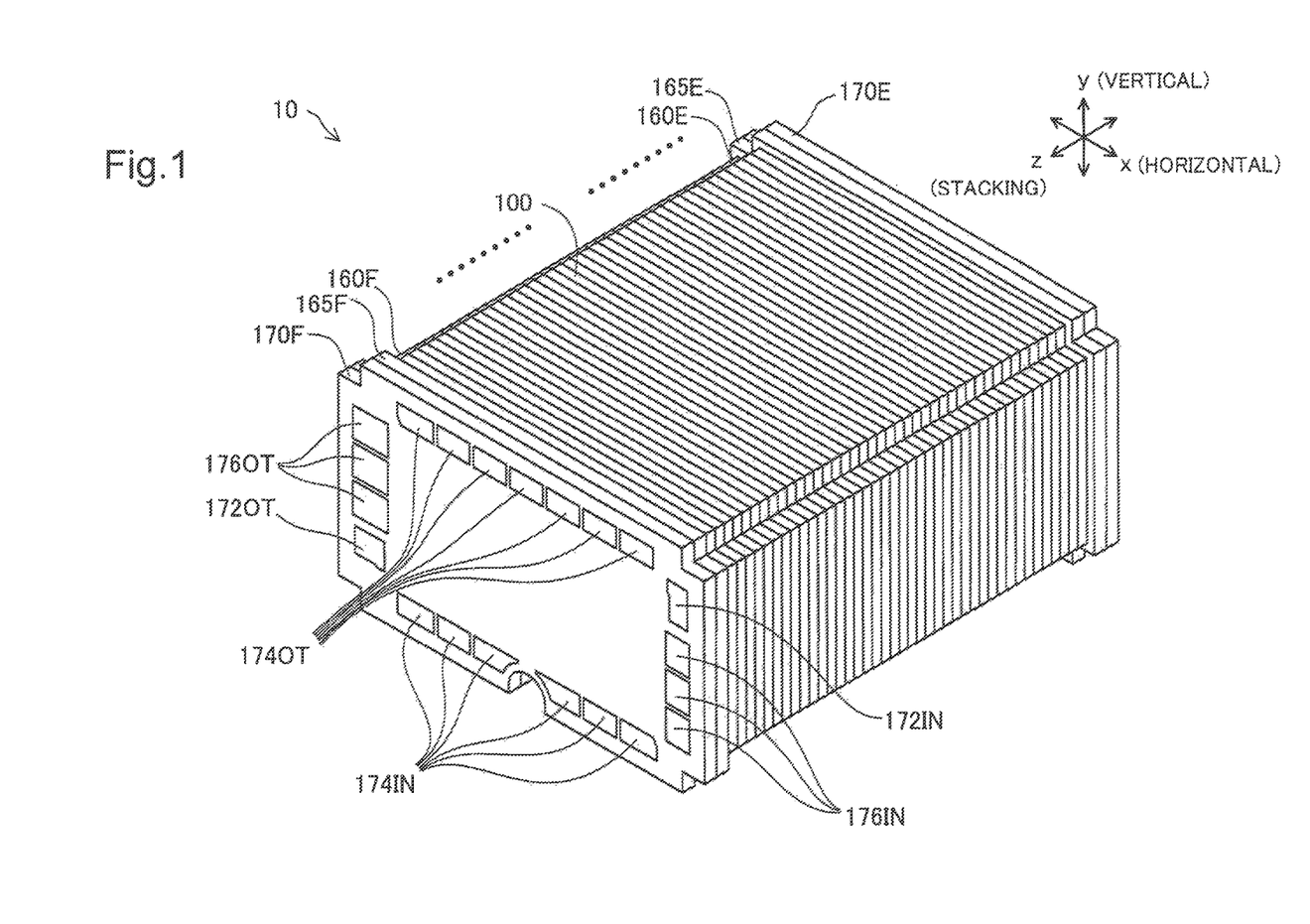
FIG. 1 is a schematic perspective view showing a configuration of a fuel cell 10 as an embodiment of the invention.

An embodiment of the present invention will be described with reference to the accompanying drawings. FIG. 1 is a schematic perspective view showing a configuration of a fuel cell 10 as an embodiment of the invention. The fuel cell 10 has a stack structure in which fuel-cell unit cells 100 are stacked in plural layers in a Z direction (hereinafter, referred to also as "stacking direction"), the unit cells are sandwiched between a pair of end plates 170F, 170E. The fuel cell 10 has a front end-side terminal plate 160F between the front end-side end plate 170F and the unit cells 100, with a front end-side insulating plate 165F interposed therebetween. The fuel cell 10 also has a rear end-side terminal plate 160E between the rear end-side end plate 170E and the unit cells 100, similarly, with a rear end-side insulating plate 165E interposed therebetween. The unit cells 100, the terminal plates 160F, 160E, the insulating plates 165F, 165E, and the end plates 170F, 170E each have a plate structure which has a generally rectangular external shape and which is positioned that its longer side extends along an X direction (horizontal direction) and its shorter side extends along a Y direction (vertical direction).

The end plate 170F, the insulating plate 165F and the terminal plate 160F on the front end side each have a fuel gas supply hole 172IN and a fuel gas discharge hole 172OT, a plurality of oxidizer gas supply holes 174IN and a plurality of oxidizer gas discharge holes 174OT, and a plurality of cooling water supply holes 176IN and a plurality of cooling water discharge holes 176OT. These supply/discharge holes are coupled to holes (not shown) provided at corresponding positions of the individual unit cells 100, respectively, to form gas or cooling water supply/discharge manifolds, respectively. On the other hand, these supply/discharge holes are not provided for the rear end-side end plates 170E, the insulating plates 165E and the terminal plates 160E on the rear end side. This is because the fuel cell is such a type that while reactant gases (fuel gas, oxidizer gas) and cooling water are being supplied from the front end-side end plate 170F to the individual unit cells 100 via the supply manifold, discharge gas and discharge water derived from the individual unit cells 100 are discharged from the front end-side end plate 170F to outside via the discharge manifold. However, the fuel cell is not limited to this and, for example, may be provided in various types such as a type that reactant gases and cooling water are supplied from the front end-side end plate 170F and discharge gas and discharge water are discharged from the rear end-side end plate 170E to outside.

The plurality of oxidizer gas supply holes 174IN are disposed along the X direction (longer-side direction) at a lower-end outer edge portion of the front end-side end plate 170F, while the plurality of oxidizer gas discharge holes 174OT are disposed along the X direction at an upper-end outer edge portion. The fuel gas supply hole 172IN is disposed at a Y-direction (shorter-side direction) upper end portion of a right-end outer edge portion of the front end-side end plate 170F, while the fuel gas discharge hole 172OT is disposed at a Y-direction lower end portion of a left-end outer edge portion. The plurality of cooling water supply holes 176IN are disposed along the Y direction under the fuel gas supply hole 172IN, while the plurality of cooling water discharge holes 176OT are disposed along the Y direction above the fuel gas discharge hole 172OT.

The front end-side terminal plate 160F and the rear end-side terminal plate 160E, which are current collector plates for generated electric power of the unit cells 100, deliver outside electric power collected from unshown terminals.

Figure 2:
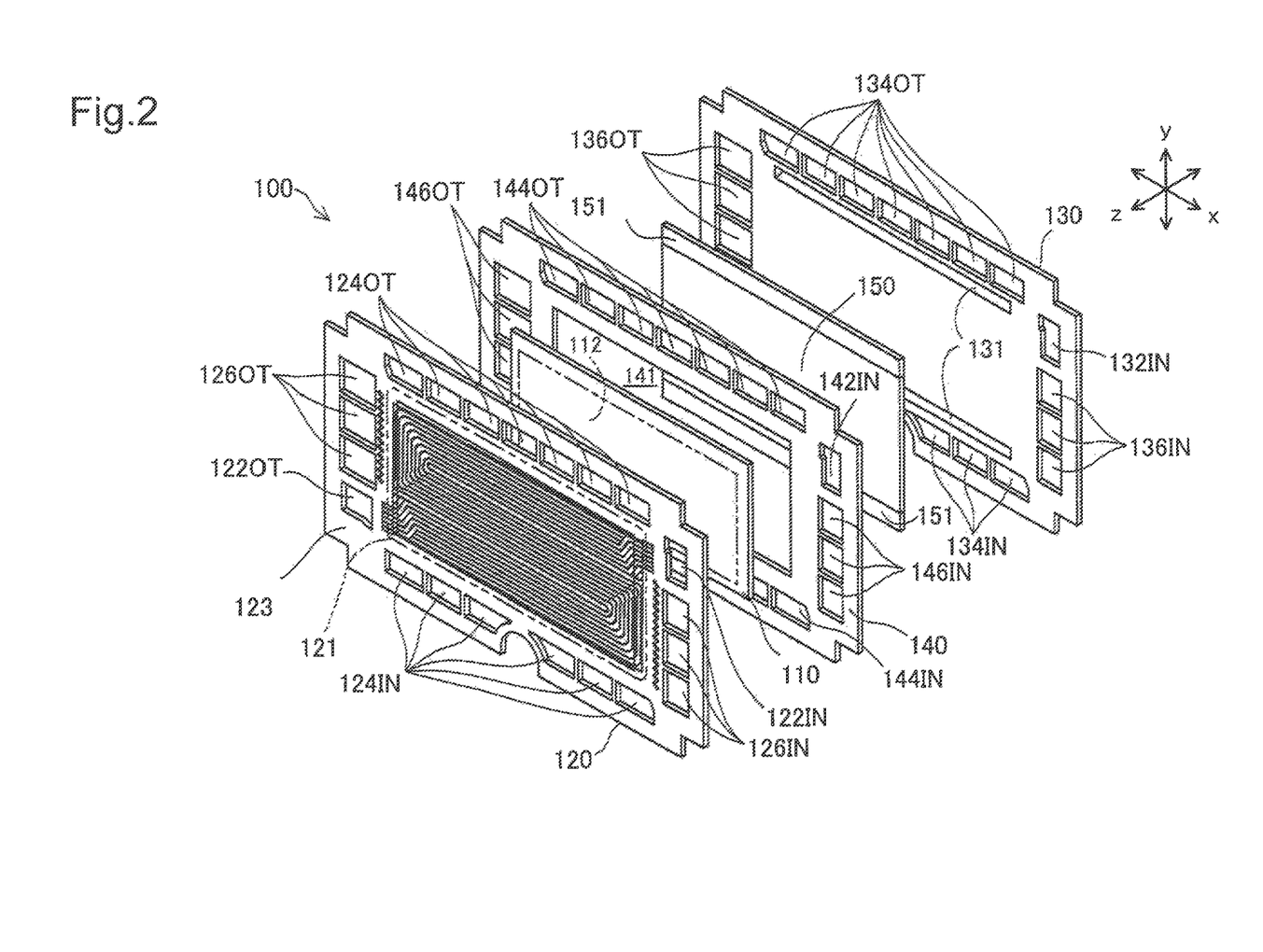
FIG. 2 is a schematic exposed perspective view showing a structure of a unit cell 100.

FIG. 2 is a schematic exploded perspective view showing a structure of a unit cell 100. As shown in the figure, the unit cell 100 includes a MEGA (Membrane Electrode & Gas Diffusion Layer Assembly) 110, an anode-side separator 120, a cathode-side separator 130, an adhesive seal 140, and a gas flow path member 150, where separators 120, 130, seal 140 and member 150 are disposed so as to sandwich both sides of the MEGA 110.

The MEGA 110 is a power generation body that includes an MEA (Membrane Electrode Assembly) with a pair of catalytic electrode layers formed on both sides of an electrolyte membrane and in which the MEA is sandwiched by gas diffusion layers (GDLs) intended for gas diffusive permeation. It is noted that the term MEGA herein may be referred to as MEA in some cases.

The anode-side separator 120 and the cathode-side separator 130 are formed from a member having gas barrier property and electron conductivity, the member exemplified by carbon members such as densified carbon formed by compacting carbon particles to impart gas impermeability thereto or metal members such as press-molded stainless steel or titanium steel. In this embodiment, the anode-side separator 120 is fabricated by press molding of stainless steel.

The anode-side separator 120 has a plurality of grooved fuel gas flow paths on MEGA 110-side surface as well as a plurality of grooved cooling water flow paths on opposite-side surface, both types of flow paths being arranged alternately on top-and-bottom surfaces of the separator. These flow paths will be described later. The anode-side separator 120 includes, as the above-described manifold-constituting supply/discharge holes, a fuel gas supply hole 122IN and a fuel gas discharge hole 122OT, a plurality of oxidizer gas supply holes 124IN and a plurality of oxidizer gas discharge holes 124OT, and a plurality of cooling water supply holes 126IN and a plurality of cooling water discharge holes 126OT. Similarly, the cathode-side separator 130 includes, a fuel gas supply hole 132IN and a fuel gas discharge hole 132OT, a plurality of oxidizer gas supply holes 134IN and a plurality of oxidizer gas discharge holes 134OT, and a plurality of cooling water supply holes 136IN and a plurality of cooling water discharge holes 136OT. Further, the adhesive seal 140 also similarly includes, in correspondence to the supply/discharge holes of the anode-side separator 120, a fuel gas supply hole 142IN and a fuel gas discharge hole 142OT, a plurality of oxygen gas supply holes 144IN and a plurality of oxidizer gas discharge holes 144OT, and a plurality of cooling water supply holes 146IN and a plurality of cooling water discharge holes 146OT.

The adhesive seal 140, which is formed from resin or rubber or the like having sealing and insulating properties, has in its center a power-generation region window 141 fitted to the rectangular shape of the MEGA 110. A peripheral edge of the power-generation region window 141 is formed into a step gap shape so that the MEGA 110 is to be fitted and assembled to the step gap portion. The MEGA 110 assembled to the power-generation region window 141 in this way overlaps with the adhesive seal 140 at the step gap portion of the adhesive seal 140, where a region exposed in the power-generation region window 141 is defined as a power generation-enabled region 112 (hereinafter, referred to as "power generation region") that receives supply of the fuel gas from the later-described anode-side separator 120 so that at least part of the region is enabled to fulfill power generation by electrochemical reaction. The adhesive seal 140 has the already-described supply/discharge holes in regions around the power-generation region window 141 to which the MEGA 110 is assembled. With the MEGA 110 assembled to the power-generation region window 141, the adhesive seal 140 seals the anode-side separator 120 and the cathode-side separator 130 with their supply/discharge holes included. That is, the adhesive seal 140 not only seals the MEGA 110 at the step gap portion in coverage to outer regions of the power generation region 112 but also seals the outer peripheral surface of the rectangular shape of the MEGA 110 between the anode-side separator 120 and the cathode-side separator 130. In addition, each of both anode-side and cathode-side separators includes fuel gas sealing materials 300, oxidizer sealing materials 301 and a cooling water sealing material 302 as shown in later-described FIG. 3 in order that sealability of the supply/discharge holes for the fuel gas, the oxidizer gas and the cooling water, respectively, is ensured at the junction surfaces between separators when the unit cells 100 are stacked.

The gas flow path member 150, which is positioned between the MEGA 110 and the cathode-side separator 130 with the adhesive seal 140 interposed therebetween, forms gas flow paths for allowing oxidizer gas, which is supplied from the oxidizer gas supply holes 134IN of the cathode-side separator 130, to flow along the planar direction (X-Y planar direction) of the MEGA 110 and be discharged through the oxidizer gas discharge holes 134OT. The gas flow path member 150 is formed by using a porous material having gas diffusivity and electrical conductivity such as a porous metal (e.g., expanded metal). Also, the gas flow path member 150 includes gas-impermeable thin sealing sheets 151 at its upper-and-lower ends as in FIG. 2, the sheets being joined with upper-and-lower end regions of the MEGA 110.

The cathode-side separator 130 is formed into a generally planar shape, including regions for formation of the already-described supply/discharge holes, and limbs 131 are protruded on the back side of the drawing sheet of FIG. 2 near the upper-and-lower ends of the gas flow path member 150 in FIG. 2. These limbs 131 are brought into contact with a later-described outer edge portion 123 of the anode-side separator 120 of a neighboring unit cell 100 when the unit cells 100 are stacked. This aspect will be described later.

Figure 3:
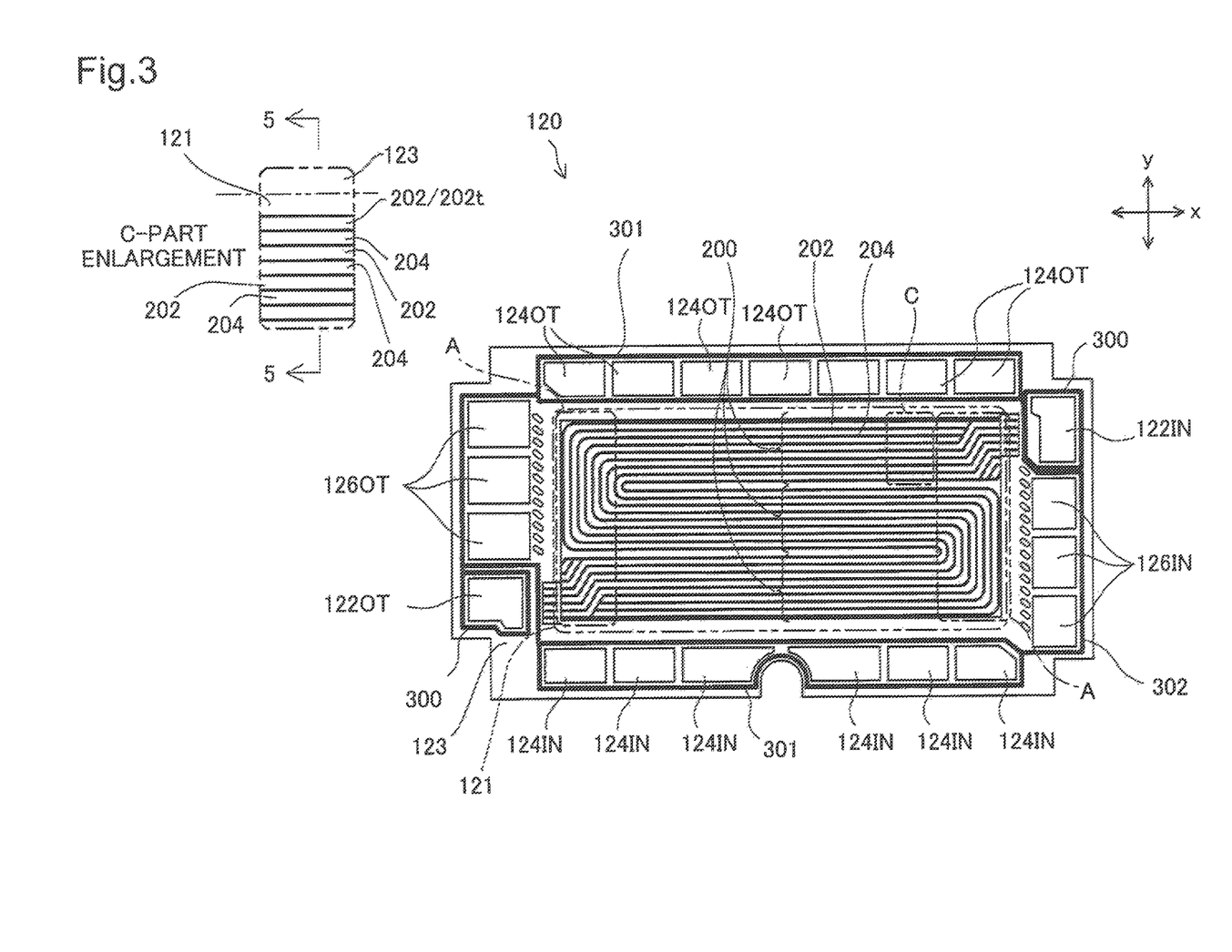
FIG. 3 is a schematic plan view showing a structure of an anode-side separator 120.

FIG. 3 is a schematic plan view showing a structure of the anode-side separator 120. This FIG. 3 shows a state as viewed from one surface (hereinafter, referred to also as "cooling surface") side facing another unit cell 100 neighboring the anode-side separator 120. A surface opposite to this cooling surface and facing the MEGA 110 will be referred to also as "gas surface." The anode-side separator 120, which is formed by press molding stainless steel or the like, sandwiches the MEGA 110 in cooperation with the cathode-side separator 130, with the adhesive seal 140 and the gas flow path member 150 interposed therebetween as shown in FIG. 2. In this anode-side separator 120, a plurality of first grooves 202 and a plurality of second grooves 204, which will be described later, are juxtaposed alternately and successively in the separator central region 121 opposed to the already-described power generation region 112 of the MEGA 110. The anode-side separator 120 includes, in a planar outer edge portion 123 extending outward from the separator central region 121 to surround the central region, as the already-described supply/discharge holes for reactant gas and cooling water, a fuel gas supply hole 122IN and a fuel gas discharge hole 122OT, a plurality of oxidizer gas supply holes 124IN and a plurality of oxidizer gas discharge holes 124OT, and a plurality of cooling water supply holes 126IN and a plurality of cooling water discharge holes 126OT. The fuel gas supply hole 122IN and the fuel gas discharge hole 122OT in these supply/discharge holes, are sealed individually by fuel gas sealing materials 300, while the plurality of oxidizer gas supply holes 124IN and the plurality of oxidizer gas discharge holes 124OT are sealed on a hole-array basis by the oxidizer sealing materials 301, respectively. Also, the plurality of cooling water supply holes 126IN and cooling water discharge holes 126OT with the cooling surface-side separator central region 121 included are sealed by the cooling water sealing material 302.

The first grooves 202 are recessed grooves that are recessed on the already-described gas surface side (first surface) of the anode-side separator 120, i.e., on the back side of the drawing sheet of FIG. 3, the grooves extending on the gas surface. The second grooves 204 are recessed grooves that are recessed on the already-described cooling surface side (second surface) of the anode-side separator 120, i.e., on the front side of the drawing sheet of FIG. 3, the grooves extending on the cooling surface. Then, the first grooves 202 and the second grooves 204 are formed into a plurality of pit-and-bump stripes by press molding in which a pit-and-bump shaped metal mold fitted to the two groove shapes is pressed against the separator central region 121 so that the two types of grooves are juxtaposed alternately and successively on the front-and-back surfaces (first and second surfaces) of the anode-side separator 120 in the separator central region 121. That is, the anode-side separator 120 is formed into a pit-and-bump shape in cross section (corrugated shape in cross section) with the first grooves 202 and the second grooves 204 juxtaposed alternately and successively, as viewed in the longitudinal sectional view of FIG. 3.

The first grooves 202 recessed on the gas surface side constitute fuel-gas flow path grooves (hereinafter, referred to also as "fuel-gas flow path grooves 202") for supplying the fuel gas to the MEGA 110 exposed in the power-generation region window 141 of the adhesive seal 140. In addition, the plurality of first grooves 202 constitute a first surface-side recessed groove part. The second grooves 204 recessed on the cooling surface side constitute ribs for partitioning the fuel-gas flow path grooves 202 and moreover constitute cooling-water flow path grooves (hereinafter, referred to also as "cooling-water flow path grooves 204") for allowing the cooling water to pass therethrough by virtue of contact of the anode-side separator 120 with the later-described cathode-side separator 130. In addition, the plurality of second grooves 204 constitute a second surface-side recessed groove part. Then, a fuel gas flow path 200 constituted of the plurality of fuel-gas flow path grooves 202 is formed on the already-described gas surface side on the drawing-sheet back side of FIG. 3 in a serpentine shape ranging from the fuel gas supply hole 122IN toward the fuel gas discharge hole 122OT. In the unit cells 100 of this embodiment, in the serpentine-shaped fuel gas flow path 200, the fuel-gas flow path grooves 202 positioned on the upper-and-lower end sides of the separator central region 121 shown in FIG. 3 extend along the left/right direction of the separator central region 121, i.e. X direction in FIG. 3, on the outer edge portion 123 side. In this case, when the separator central region 121 is opposed to the power generation region 112 of the MEGA 110, the fuel gas can be supplied also to peripheral edges of the power generation region 112 from the fuel-gas flow path grooves 202 extending in the left/right direction of the separator central region 121 on the outer edge portion 123 side. It is noted that, as shown in C-part enlargement of FIG. 3, first grooves 202 which are positioned on upper-and-lower terminal-end sides of the separator central region 121 and which extend in the left/right direction of the separator central region 121 on the outer edge portion 123 side will be referred to as terminal first grooves 202t so as to be distinguishable from first grooves 202 positioned inside the separator central region 121.

The fuel-gas flow path grooves 202, which are formed into serpentine-shaped groove paths, are changed in groove-path direction from the X direction to the Y direction or, conversely, from the Y direction to the X direction in the turn-over regions A, which are right-and-left horizontal-end side regions of the separator central region 121 shown in FIG. 3. Then, the first grooves 202, including the turn-over regions A, function as ribs for partitioning the cooling-water flow path grooves 204 on the cooling surface side in the linear flow path region extending in the X direction. The fuel-gas flow path grooves 202, whereas functioning as ribs for partitioning the cooling-water flow path grooves 204 in the linear flow path region extending in the X direction, do not obstruct the flow of cooling water at the second grooves 204 directed toward the cooling water discharge holes 126OT. However, in the turn-over regions A in which the groove-path direction is changed, the fuel-gas flow path grooves 202 serve as walls that can obstruct the flow of cooling water directed from the cooling water supply holes 126IN toward the cooling water discharge holes 126OT. Therefore, for prevention of this, the fuel-gas flow path grooves 202 in those regions are provided in a structure described below.

Figure 4:
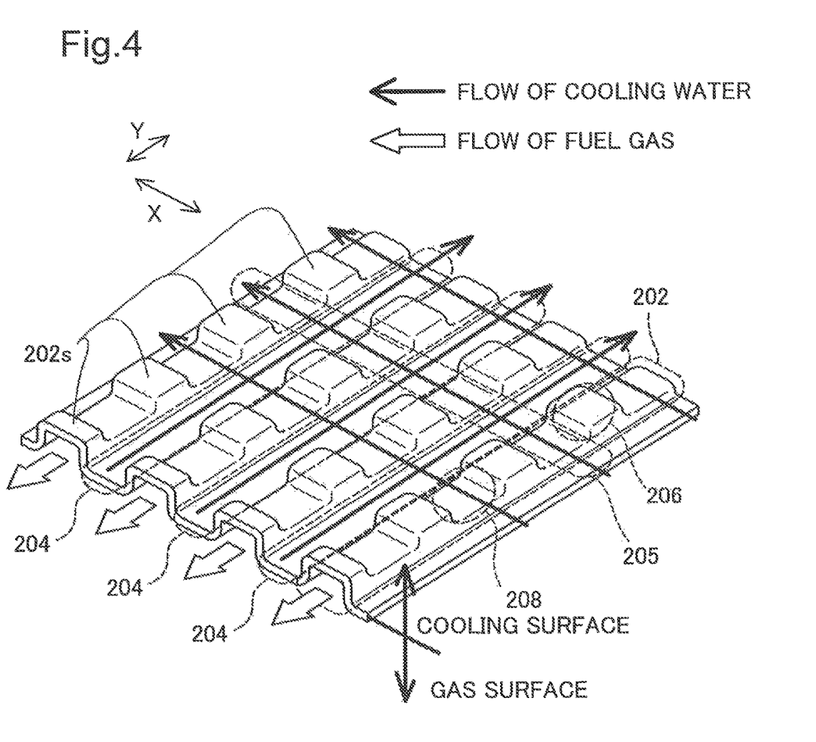
FIG. 4 is a schematic perspective view showing, in enlargement, part of fuel-gas flow path grooves 202 extending along a Y direction out of a fuel gas flow path 200 within a turn-over region A shown in FIG. 3.

FIG. 4 is a schematic perspective view showing, in enlargement, part of the fuel-gas flow path grooves 202 extending along the Y direction out of the fuel gas flow path 200 within the turn-over region A shown in FIG. 3. In FIG. 4, the upper side is the cooling surface side while the lower side is the gas surface side. In the fuel-gas flow path grooves 202 formed along the Y direction, shallow groove portions 208 are formed. The shallow groove portions 208 are portions shallower in depth than the other portions (referred to also as "deep groove portions 206"). It is noted here that the term, depth of a fuel-gas flow path groove 202, refers to a distance ranging from a position of its contact with the MEGA 110 in the gas surface of the anode-side separator 120 to a bottom of the fuel-gas flow path groove 202. Accordingly, although the depth of the fuel-gas flow path grooves 202 is deeper in positions of the deep groove portions 206 and shallower at positions of the shallow groove portions 208, yet the deep groove portions 206 and the shallow groove portions 208, which are juxtaposed alternately and successively along the groove paths of the fuel-gas flow path grooves 202 in the turn-over regions A of FIG. 3, are both out of contact with the MEGA 110. Thus, the fuel-gas flow path grooves 202 allow the fuel gas to pass therethrough along the Y direction in FIG. 4 and along the flow-path-groove routes in the turn-over regions A of FIG. 3. In this case, the deep groove portions 206 are set equal in depth to fuel-gas flow path grooves 202 in the flow-path-groove routes other than in the turn-over regions A.

Also, in the fuel cell 10 in which a plurality of unit cells 100 are stacked (see FIGS. 1 and 2), the anode-side separator 120 is so arranged that outer peripheral surfaces, i.e. ceiling surfaces in FIG. 4, of bottom walls 202s of the individual deep groove portions 206 are set into contact with the surface of the cathode-side separator 130 of a neighboring unit cell 100, but are kept out of contact with the cathode-side separator 130 at the positions of the shallow groove portions 208. As a result of this, on the cooling surface side at positions of the shallow groove portions 208 in the anode-side separator 120, communicative flow path grooves 205 are formed against the surface of the cathode-side separator 130 so that two cooling-water flow path grooves 204 neighboring each other with the shallow groove portions 208 interposed therebetween are communicated with each other. With this structure, the cooling water is allowed to not only flow in the Y direction along the cooling-water flow path grooves 204, but also flow in the X direction via the communicative flow path grooves 205. As a result, cooling water flowing through the cooling-water flow path grooves 204 extending along the X direction in the turn-over regions A flows along the cooling-water flow path grooves 204 or across the neighboring cooling-water flow path grooves 204 without being interrupted by the fuel-gas flow path grooves 202 extending along the Y direction. Thus, in the turn-over regions A, the flow of cooling water flowing through the cooling-water flow path grooves 204 extending along the X direction can be prevented from being interrupted by the fuel-gas flow path grooves 202 extending along the Y direction, and vice versa.

Although not shown, shallow groove portions 208 are similarly formed also in the fuel-gas flow path grooves 202 extending in the X direction in the turn-over regions A shown in FIG. 3. As a result of this, the flow of cooling water flowing through the cooling-water flow path grooves 204 parallel to the fuel-gas flow path grooves 202 extending along the Y direction can be prevented from being interrupted by the fuel-gas flow path grooves 202 extending along the X direction. Thus, the anode-side separator 120 allows cooling water supplied from the cooling water supply holes 126IN to flow toward the cooling water discharge holes 126OT without being interrupted by the fuel-gas flow path grooves 202 extending along the X direction or the Y direction.

The anode-side separator 120 has the fuel-gas flow path grooves 202 in which the deep groove portions 206 and the shallow groove portions 208 are juxtaposed alternately and successively along the groove paths in the turn-over regions A of FIG. 3. Meanwhile, in the linear path routes of the serpentine-shaped groove paths, i.e. in the X direction of FIG. 3, other fuel-gas flow path grooves 202 including the terminal first grooves 202*t* on the gas surface side as well as the cooling-water flow path grooves 204 on the cooling water side in the anode-side separator 120 are formed into simple recessed groove shapes.

Figure 5:
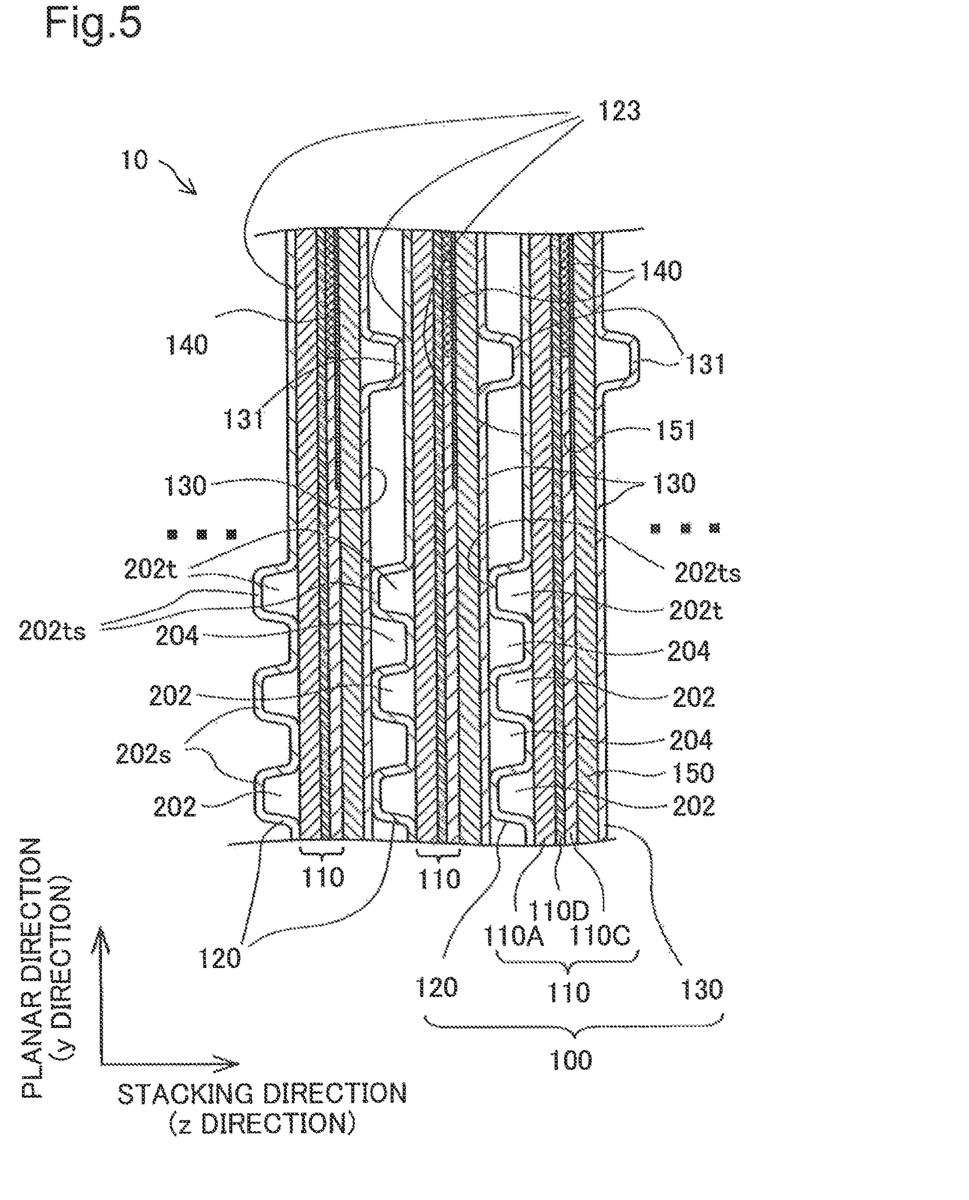
FIG. 5 is a schematic sectional view of the fuel cell 10 taken along a line 5-5 in the C-part enlargement of FIG. 3.

Next, the way how the unit cells 100 are stacked in the fuel cell 10 will be described. FIG. 5 is a schematic sectional view of the fuel cell 10 taken along a line 5-5 in the C-part enlargement of FIG. 3. As shown in the figure, the fuel cell 10 is made up by stacking a plurality of unit cells 100, where each unit cell 100 has the MEGA 110 sandwiched by the anode-side separator 120 and the cathode-side separator 130. In this FIG. 5, the MEGA 110 is depicted in an aspect that an MEA 110D having catalytic electrode layers joined on both membrane surfaces of an electrolyte membrane is sandwiched by an anode-side gas diffusion layer 110A and a cathode-side gas diffusion layer 110C. Then, for each unit cell 100, the outer edge portion 123 (see FIGS. 2 and 3) which is included in the anode-side separator 120 so as to extend outward of the separator central region 121 is joined to the MEGA 110 at peripheral edges of the power generation region 112 (see FIGS. 2 and 3) of the MEGA 110. Also in each unit cell 100, the separator central region 121 with the first grooves 202 and the second grooves 204 already formed therein is opposed to and brought into contact with the power generation region 112 of the MEGA 110. As a result of this, the terminal first grooves 202*t* and the first grooves 202 of other sites are closed at their recessed-groove opening ends by the MEGA 110, thus functioning as the fuel-gas flow path grooves 202 extending as already described.

With regard to unit cells 100 stacked adjoiningly each other, bottom walls 202*s* of first grooves 202 as well as terminal bottom walls 202*ts* of terminal first grooves 202*t* of the anode-side separator 120 in one unit cell 100 are brought into contact with the cathode-side separator 130 in the other unit cell 100. As a result of this, the second grooves 204 are closed at their recessed-groove opening ends, functioning as the cooling-water flow path grooves 204 extending as already described. Also with regard to unit cells 100 stacked so as to neighbor each other, limbs 131 of the cathode-side separator 130 in one unit cell 100 are brought into contact with the outer edge portion 123 of the anode-side separator 120 in the other unit cell 100. As a result of this, the limbs 131 function as support of the individual unit cells 100 at the outer edge portion 123 of the anode-side separator 120. The fuel cell 10 in which the unit cells 100 are stacked as described above is tightened in the cell-stacking direction with an unshown tightening shaft or the like, where the tightening force normally extends to the individual component sites of the unit cells 100, in more detail, to not only the power generation region 112 but also the regions of the outer edge portion 123 in the MEGA 110.

Figure 6:
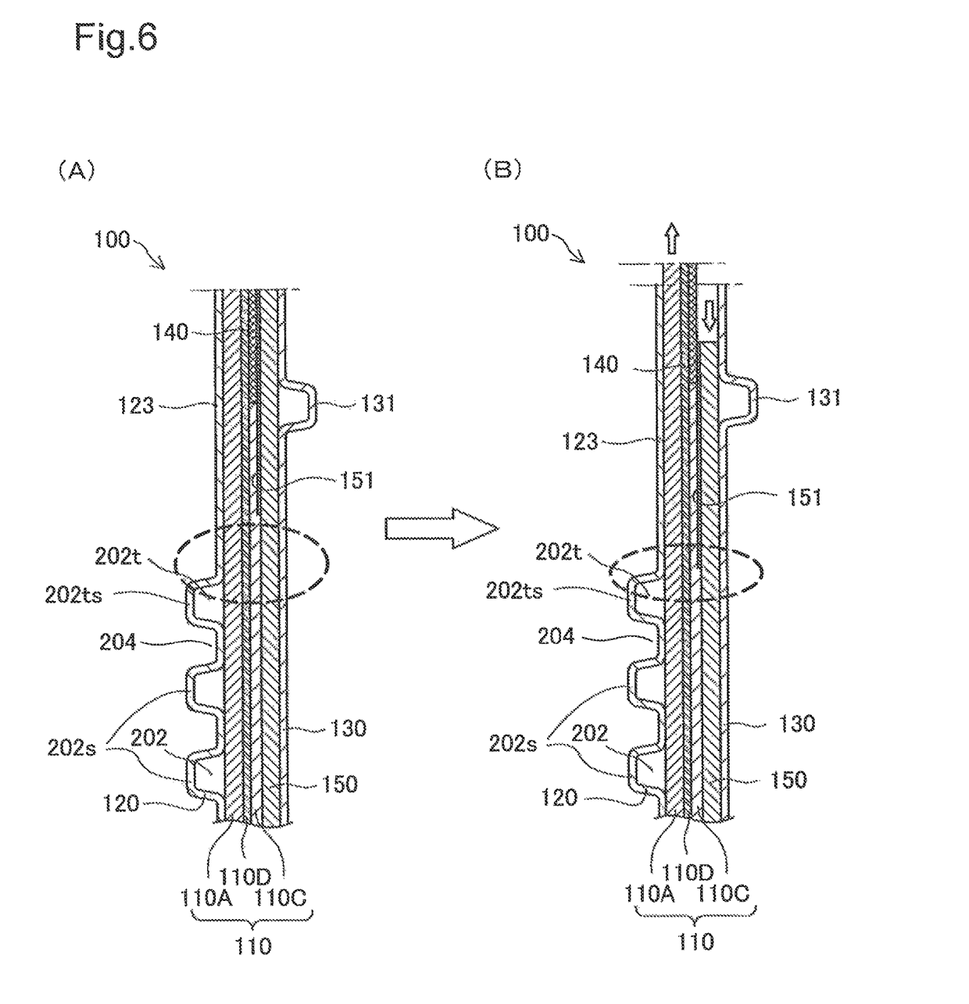
FIG. 6 is an explanatory view for explaining an aspect that assumable excessive surface pressure is generated under the condition that component members of the unit cell 100 are within specified dimensions or its assembling accuracy is within a permissible range.

FIG. 6 is an explanatory view for explaining an aspect that assumable excessive surface pressure is generated under the condition that component members of the unit cell 100 are within specified dimensions or its assembling accuracy is within a permissible range. FIG. 6 (A) shows a state that the assembling accuracy for the MEGA 110, the adhesive seal 140 and the gas flow path member 150 is ensured. Even in such a case, at places where the adhesive seal 140, to which the MEGA 110 is fitted, or the sealing sheets 151 of the gas flow path member 150 are interposed, even if the individual members are within the specified dimensions, there is a possibility that in the outer edge portion 123, the peripheral edge of the MEGA 110 is to be sandwiched in cooperation with the cathode-side separator 130, more specifically, the peripheral edge of the power generation region 112 shown in FIG. 1 increases in thickness depending on cumulated dimensional errors or the way of overlapping with the MEGA 110. That is, at such boundary positions where end portions of the adhesive seal 140 or the sealing sheet 151 of the gas flow path member 150, which are another member different from the MEGA 110, are stacked, the thickness in the stacking direction may increase so as to be thicker than the thickness in the stacking direction of the power generation region 112.

FIG. 6 (B) shows an aspect that the MEGA 110, the adhesive seal 140 or the gas flow path member 150 is displaced vertically within the assembling accuracy as in the figure, with exaggeration for an easier understanding. In such a case, even if the individual members are within the specified dimensions, there may occur a change in the state of interposition of the adhesive seal 140, to which the MEGA 110 is fitted, or the sealing sheet 151 of the gas flow path member 150, thus leading to an increase in the thickness of the peripheral edge of the MEGA 110, which is an object to be sandwiched in cooperation with the cathode-side separator 130 also in this case. Such cases can occur around some terminal first grooves 202*t* extending on the outer edge portion 123 side corresponding to or proximate to the boundary position. In contrast to this, since places around the other first grooves 202 positioned more inside the separator central region 121 (see FIG. 3) than the terminal first grooves 202*t* belong to the power generation region 112 of the MEGA 110, there are no interposition (no correspondence to the boundary position) of other members such as the sealing sheet 151 or the adhesive seal 140, so that the thickness of the MEGA 110, which is an object to be sandwiched in cooperation with the cathode-side separator 130, becomes generally uniform.

Figure 7:
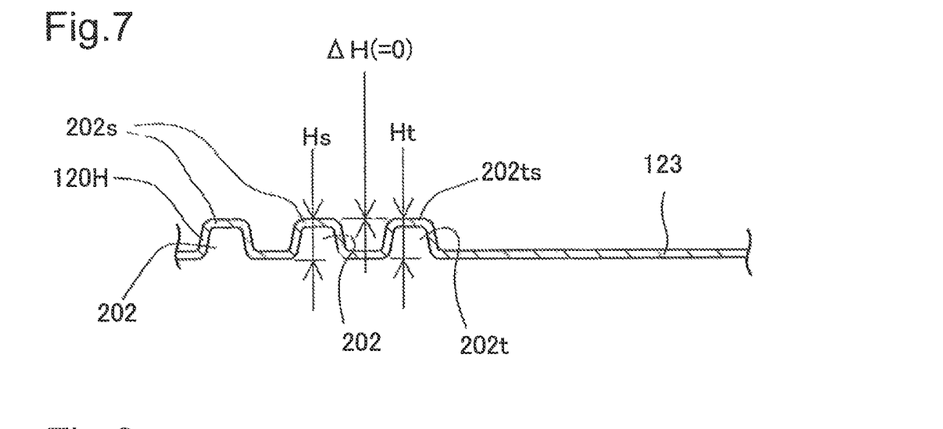
FIG. 7 is an explanatory view for explaining a technical concept that has conventionally been adopted for formation of the anode-side separator.
Figure 8:
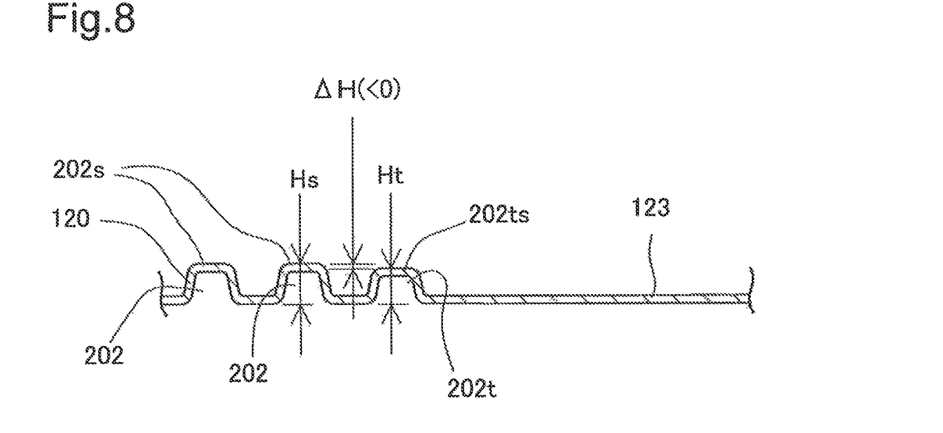
FIG. 8 is an explanatory view for explaining a technical concept that is adopted in this embodiment.

FIG. 7 is an explanatory view for explaining a technical concept that has conventionally been adopted for formation of the anode-side separator. FIG. 8 is an explanatory view for explaining a technical concept that is adopted in this embodiment. As shown in FIG. 7, even in the conventional anode-side separator 120H, the terminal first grooves 202*t* and the first grooves 202 are included in the separator central region 121 (see FIGS. 2 and 3). In this anode-side separator 120H as a comparative example, the terminal first grooves 202*t* extending on the outer edge portion 123 side and the other first grooves 202 positioned inside the separator central region 121 are treated equivalently so that a rising height from a recessed-groove opening end to the terminal bottom wall 202ts of one terminal first groove 202t (hereinafter, referred to as terminal-side rising height Ht) and another rising height from the recessed-groove opening end to the bottom wall 202s of another first groove 202 (hereinafter, referred to as rising height Hs) are set equal to each other in design dimension and actual measured dimension (terminal-side rising height Ht=rising height Hs). Accordingly, a difference ΔH between the rising height Hs and the terminal-side rising height Ht equals to a value of zero. In contrast to this, in the anode-side separator 120 of this embodiment, as shown in FIG. 8, for the terminal first grooves 202t, the terminal-side rising height Ht is set lower than the rising height Hs of the other first grooves 202 so that their difference ΔH becomes a negative value, where the difference ΔH is set to −0.01 to −0.03 in this case. That is, even if actual dimensions of the terminal-side rising height Ht of the terminal first grooves 202t and the rising height Hs of the other first grooves 202 are within manufacturing tolerances, the difference ΔH between the two rising heights is required to fall within the above-described range of negative values. In addition, the terminal first grooves 202t may be a singularity of terminal first groove 202t positioned on the outermost edge portion 123 side or otherwise may be a singularity or plurality of terminal first grooves 202t positioned on or close to the outer edge portion 123 side.

Figure 9:
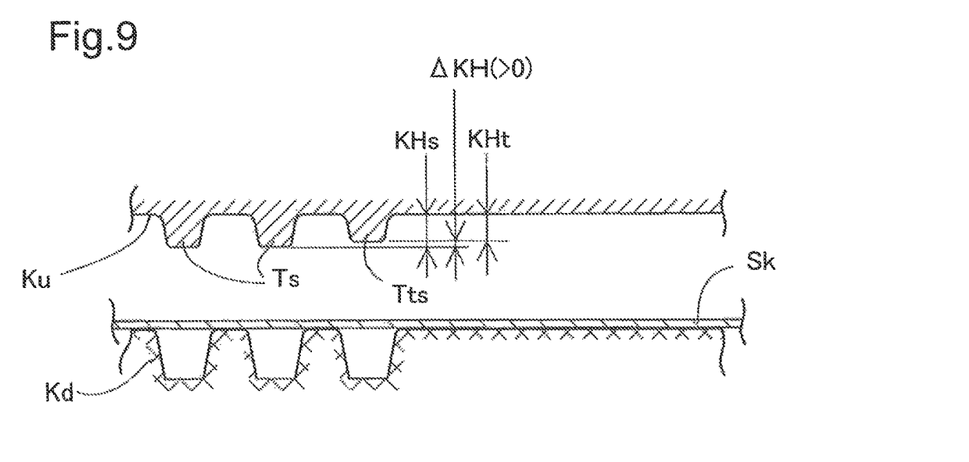
FIG. 9 is an explanatory view showing an outline of press equipment for molding the anode-side separator 120 of the embodiment shown in FIG. 8.

FIG. 9 is an explanatory view showing an outline of press equipment for molding the anode-side separator 120 of the embodiment shown in FIG. 8. As shown in the figure, a press male mold Ku and a press female mold Kd are used for obtainment of the anode-side separator 120 of FIG. 8. The press female mold Kd has recessed stripe-shaped cavities into which later-described protrusive stripes of the press male mold Ku are to be fitted, which is a structure similar to an existing one. The press male mold Ku has first protrusive stripes Ts of protrusive stripes fitted to the recessed-groove shape of the first grooves 202 of the anode-side separator 120, and terminal first protrusive stripes Tts of protrusive stripes fitted to the recessed-groove shape of the terminal first grooves 202t. Then, the protruding height KHs of the first protrusive stripes Ts and the protruding height KHt of the terminal first protrusive stripes Tts are given a difference therebetween, where their protruding height difference ΔKH (=KHs−KHt) is set to a positive value (+0.01 to +0.03) in this case. With use of this metal mold, press molding a stainless steel plate Sk as a molding material of the anode-side separator 120 by existing pressing procedure makes it possible to set the terminal-side rising height Ht of the terminal first grooves 202t normally lower than that of the other first grooves 202 within the above-described negative-value range.

Figure 10:
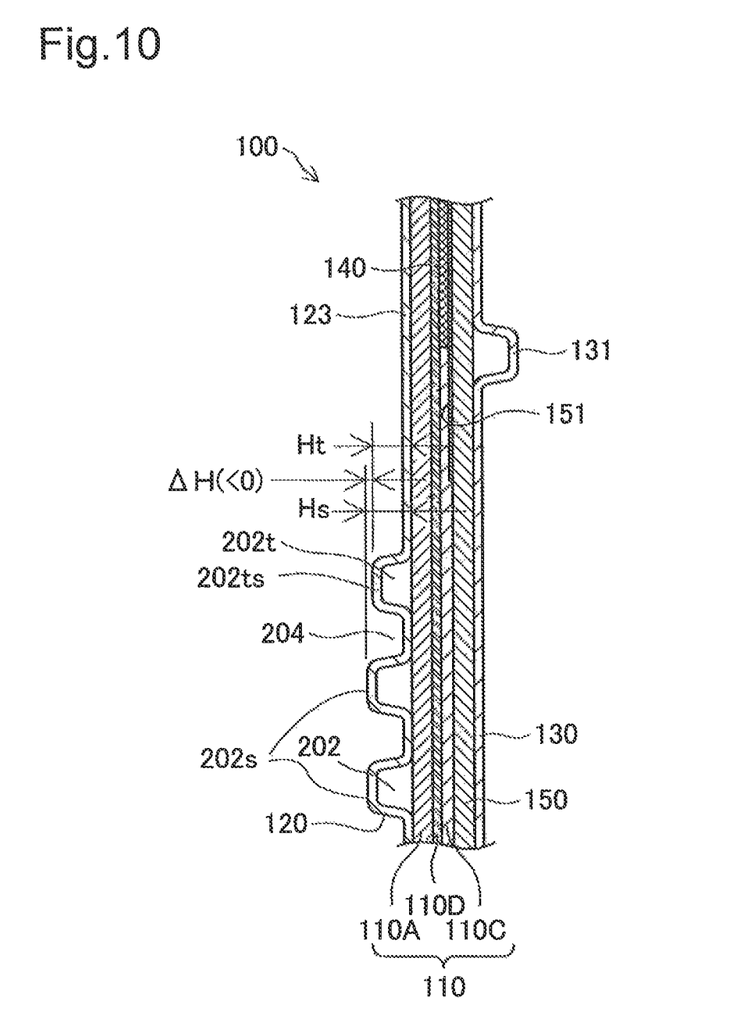
FIG. 10 is an explanatory view showing the unit cell 100 of this embodiment as viewed in a cross section along a line 5-5 in the C-part enlargement of FIG. 3, with details of the rising heights described in combination.

FIG. 10 is an explanatory view showing the unit cell 100 of this embodiment as viewed in a cross section along a line 5-5 in the C-part enlargement of FIG. 3, with details of the rising heights described in combination. As shown in FIG. 10, the unit cell 100, in a completed state as a unit alone, has the terminal bottom walls 202ts of the terminal first grooves 202t smaller than the bottom walls 202s of the other first grooves 202 by a depicted difference ΔH. However, in the stacked-and-tightened state shown in FIG. 5, i.e., in the state of the fuel cell 10, since each unit cell 100 receives tightening force at its individual sites, the terminal first groove 202t also has its terminal bottom wall 202ts put into contact with the cathode-side separator 130 of the neighboring unit cell 100.

Even with the unit cell having the anode-side separator 120H as the comparative example shown in FIG. 7, as already described, the tightened state as the fuel cell 10 incurs occurrence of contact of the outer edge portion 123 of the anode-side separator 120H with the peripheral edge of the power generation region 112 (see FIGS. 2 and 3) of the MEGA 110, contact of the separator central region 121 with the power generation region 112 of the MEGA 110, contact of the bottom walls 202s and the terminal first groove 202t of the first grooves 202 with the cathode-side separator 130 of the other unit cell 100, and contact of the limbs 131 with the outer edge portion 123 of the other unit cell 100. Such a contact state is continued while the tightening force remains applied, where the tightening force normally has an effect to not only the power generation region 112 but also the region of the outer edge portion 123 in the unit cells each having the anode-side separator 120H of the comparative example.

The anode-side separator 120H as the comparative example of FIG. 7, in which the terminal first grooves 202t and the other first grooves 202 are equivalent to each other, can be considered that, as described with FIG. 6, no measures are provided for increases in thickness at the peripheral edge of the power generation region 112 due to the interposition of the adhesive seal 140 and the sealing sheets 151 of the gas flow path member 150. Therefore, in the anode-side separator 120H of the comparative example, at the peripheral edge of the power generation region 112 encircled by a broken line in FIG. 6, surface pressure is locally increased due to the above-described increases in thickness, so that buckling of the MEA 110D or damage to the electrolyte membrane might be incurred.

In the anode-side separator 120 of this embodiment, the terminal first grooves 202t extending on the outer edge portion 123 side are so designed that the terminal-side rising height Ht from the recessed-groove opening end of the terminal bottom wall 202ts becomes lower than the rising height Hs of the other first grooves 202 (difference ΔH<0; see FIGS. 8 and 10). Therefore, according to the anode-side separator 120 of this embodiment, the surface pressure applied to the planar-shaped outer edge portion 123 extending on the outer edge of the separator central region 121 is relaxed in comparison to vicinities of the other first grooves 202 in the separator central region 121 by the difference ΔH (<0) between the terminal-side rising height Ht and the rising height Hs. As a result of this, according to the anode-side separator 120 of the embodiment, even when a large surface pressure is applied to the separator central region 121 and the planar-shaped outer edge portion 123 extending on its outer edge with the MEGA 110 sandwiched in cooperation with the cathode-side separator 130, buckling of the MEA 110D and damage to the electrolyte membrane can be avoided or suppressed by relaxation of the surface pressure around the terminal first grooves 202t extending on the outer edge portion 123 side.

According to the anode-side separator 120 of the embodiment, since it is needed only to set the terminal-side rising height Ht of the terminal first grooves 202t lower than the rising height Hs of the other first grooves 202, all that is required is to lower the protruding height KHt of the terminal first protrusive stripes Tts corresponding to the terminal first grooves 202t as shown in FIG. 9. Lowering the protruding height KHt of the terminal first protrusive stripes Tts can be achieved easily by grinding of the vertices of the terminal first protrusive stripes Tts with use of precision grindstone equipment. Thus, according to the anode-side separator 120 of the embodiment, the separator manufacturing cost can be reduced and moreover such failures as generation of excessive surface pressure that can occur due to the effect of the tightening force extending to individual sites of the unit cell 100 as well as resultant buckling of the MEA and damage to both membrane surfaces of the electrolyte membrane can be solved or suppressed by a simple means of grinding of the vertices of the terminal first protrusive stripes Tts in the press male mold Ku. Still, since it is needed only to grind the vertices on the existing press male mold Ku, effective use of existing equipment can be made and moreover the separator manufacturing cost can be further reduced by a reduction of the metal mold cost.

Such failures as generation of excessive surface pressure that can occur due to the effect of the tightening force extending to individual sites of the unit cell 100 as well as resultant buckling of the MEA and damage to both membrane surfaces of the electrolyte membrane are caused by cumulated errors of individual members such as the adhesive seal 140 and the sealing sheets 151 of the gas flow path member 150 or by displacement of these members within the assembling accuracy, as shown in FIG. 6. The anode-side separator 120 of this embodiment avoids or suppresses those failures described above even when those cumulated errors of the individual members or their displacement within the assembling accuracy has occurred. Therefore, since manufacturing tolerances and assembling accuracy of the individual members can be relaxed to some extent, the separator manufacturing cost and resultantly the fuel cell manufacturing cost can be further reduced through reductions of the component manufacturing cost and the assembling cost.

The fuel cell 10 of this embodiment uses the anode-side separator 120 that allows relaxation of the surface pressure around the terminal first grooves 202*t* extending on the outer edge portion 123 side. Therefore, according to the fuel cell 10 of this embodiment, since such a local increase in surface pressure as described above is not incurred during the power generation operation of the fuel cell, buckling of the MEA 110D and damage to the electrolyte membrane can be avoided or suppressed, so that the service life of the fuel cell can be prolonged and moreover its cell performance can be sustained.

In the fuel cell 10 of this embodiment, the anode-side separator 120, in which the terminal-side rising height Ht of the terminal bottom walls 202*ts* of the terminal first grooves 202*t* extending on the outer edge portion 123 side is set lower, may be replaced with another one in the existing unit cell 100. Therefore, according to the fuel cell 10 of this embodiment, a reduction of the fuel cell manufacturing cost can be fulfilled and, what is more, such failures as generation of excessive surface pressure that can occur due to the effect of the tightening force extending to individual sites of the unit cell 100 as well as resultant buckling of the MEA and damage to both membrane surfaces of the electrolyte membrane can be solved or suppressed with simplicity.

The present invention is not limited to the above-described embodiment and may be implemented in various configurations unless those configurations depart from the gist of the invention. For example, technical features in the embodiment corresponding to technical features in the individual aspects described in the section of Summary of the Invention may be replaced or combined with one another, as required, in order to solve part or entirety of the above-described problems or to achieve part or entirety of the above-described advantageous effects. Moreover, those technical features may be deleted, as required, unless herein otherwise described as indispensable.

In the anode-side separator 120 of the above-described embodiment, those first grooves 202 positioned on the upper-and-lower end sides of the separator central region 121 and extending in the left/right direction (x direction in FIG. 3) of the separator central region 121 on the outer edge portion 123 side in the first grooves 202 provided in the separator central region 121 are provided as the terminal first grooves 202*t* having the lower terminal-side rising height Ht. However, this is not limitative and, for example, those first grooves 202 formed along the Y direction in FIG. 3 on the outer edge portion 123 side may also be provided as terminal first grooves 202*t* having the lower terminal-side rising height Ht.

What is claimed is:

1. A fuel cell in which a plurality of fuel-cell unit cells are stacked, each fuel-cell unit cell having a membrane electrode assembly sandwiched between a first separator and a second separator, wherein each of the fuel-cell unit including a fuel cell separator assembled to a membrane electrode assembly and having a first surface and a second surface as a back surface of the first surface as the first separator, the fuel cell separator comprising:

a central region opposed to a power generation-enabled region of the membrane electrode assembly, the power generation-enabled region of the membrane electrode assembly having a peripheral edge portion;

a planar-shaped outer edge portion extending from the central region to an outer edge of the fuel cell separator;

a first surface-side recessed groove part formed in the central region on the first surface in which fuel gas flows; and a second surface-side recessed groove part formed in the central region on the second surface in which cooling liquid flows, wherein grooves of the first surface-side recessed groove part and grooves of the second surface-side recessed groove part are located alternately on the first surface and the second surface in the central region, and wherein the grooves of the first surface-side recessed groove part each have a maximum depth from the membrane electrode assembly to a bottom wall of the first surface-side recessed groove part, and one or more of the grooves in a portion of the central region corresponding to the peripheral edge portion of the membrane electrode assembly have a maximum depth that is shallower than a maximum depth of grooves in a portion of the central region inside of the portion corresponding to the peripheral edge portion of the membrane electrode assembly.

2. A fuel cell in which a plurality of fuel-cell unit cells are stacked, each fuel-cell unit cell having a membrane electrode assembly sandwiched between a first separator and a second separator, wherein each of the fuel-cell unit cells includes a fuel cell separator assembled to a membrane electrode assembly and having a first surface and a second surface as a back surface of the first surface as the first separator, the fuel cell separator comprising:

a central region opposed to a power generation-enabled region of the membrane electrode assembly, the power generation-enabled region of the membrane electrode assembly having a peripheral edge portion;

a planar-shaped outer edge portion extending from a separator central region opposed to the power generation region of the membrane electrode assembly to an outer edge of the separator central region;

a first surface-side recessed groove part formed on one surface side in the separator central region on the first surface in which fuel gas flows; and a second surface-side recessed groove part formed on the other surface side in the separator central region on the second surface in which cooling liquid flows, wherein grooves of the first surface-side recessed groove part and grooves of the second surface-side recessed groove part are located alternately between front and back surfaces of the separator on the first surface and the second surface in the separator central region, the outer edge portion is joined to a site outside the power generation region of the membrane electrode assembly, and wherein the grooves of the first surface-side recessed groove part each have a maximum depth from the membrane electrode assembly to a bottom wall of the first surface-side recessed groove part, and one or more of the grooves in the outer edge portion have a maximum depth that is shallower than a maximum depth of grooves inside of the outer edge portion.

3. The fuel cell of claim 1, wherein the grooves are formed as a plurality of pit-and-bump stripes by press molding on the central region.

4. The fuel cell of claim 2, wherein the grooves are formed as a plurality of pit-and-bump stripes by press molding on the separator central region.

* * * * *